Dec. 18, 1928.　　　　　　　　　　　　　　　　1,695,898
C. A. LAEMMEL
PLATE FOR MEAT GRINDING MACHINES
Filed Oct. 7, 1927
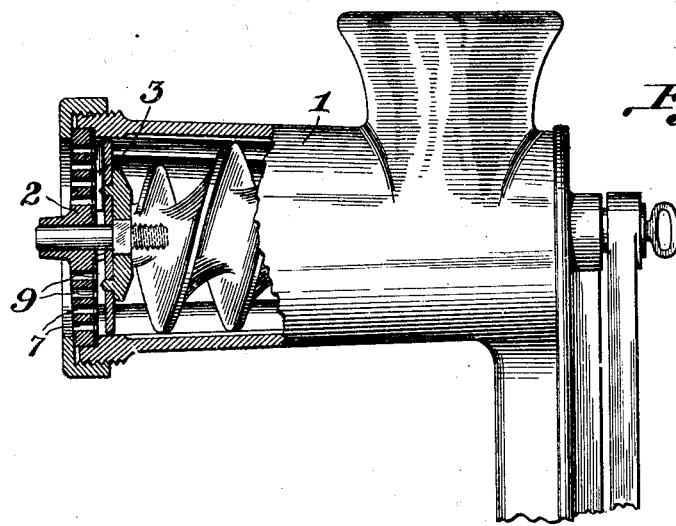
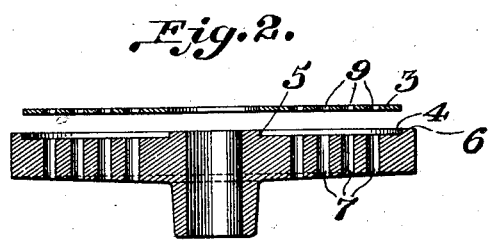
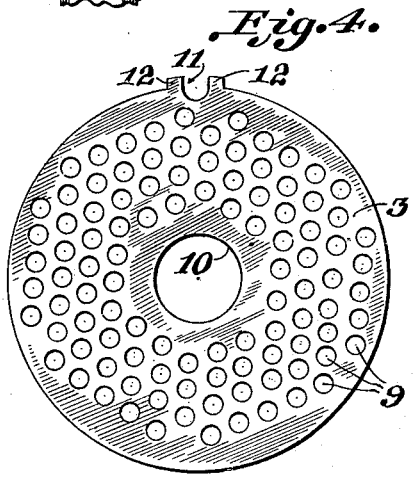
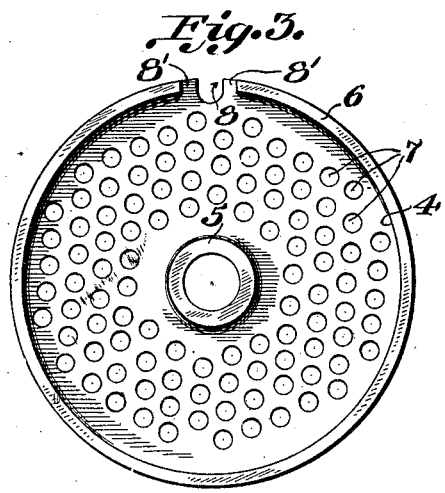
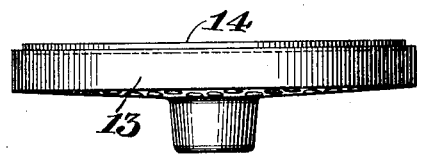
Inventor
Charles A. Laemmel
By Parker Cook
Attorney Patented Dec. 18, 1928.

1,695,898

UNITED STATES PATENT OFFICE.

CHARLES A. LAEMMEL, OF BROOKLYN, NEW YORK, ASSIGNOR TO ATLANTIC SERVICE COMPANY, INC., OF BROOKLYN, NEW YORK, A CORPORATION OF NEW YORK.

PLATE FOR MEAT-GRINDING MACHINES.

Application filed October 7, 1927. Serial No. 224,584.

My invention relates to new and useful improvements in meat choppers and more especially to the plate at the rear end of the meat chopper through which the meat is forced after being cut by the usual revolving knife.

One of the objects of the invention is to provide a plate in the form of a casing in which a relatively thin hardened disc is secured so that instead of employing a relatively thick plate out of hardened steel, a less expensive metal is used for a casing in which is secured the relatively thin hardened steel disc.

Still another object of the invention is to provide a relatively thick plate in the form of a casing of cheap metal in which is secured the disc of hardened steel and the hardened disc being so secured that it may only be removed by a factory operation.

As is well-known to those familiar with this art, the end plate of the meat grinder has to be relatively thick in cross section so that the holes thru which the meat is passed are of sufficient depth to form the meat in the long threads or long strings, it being impossible to simply use, say, a relatively thin plate, provided with perforations.

Still another object of the invention therefore is to provide the thick plate with the holes therein, this plate being in the form of a casing so that a relatively thin hardened steel plate may be secured therein which cannot be removed except by factory operation where it may then be ground and sharpened for further use and again placed within the casing.

With these and other objects in view, my invention consists in certain new and novel arrangements and combination of parts as will be hereinafter more fully described and pointed out in the claims.

Referring to the drawings showing a preferred embodiment and a slightly modified form.

Fig. 1 is a view of a conventional form of meat cutter in which is secured my improved plate, Fig. 2 is a cross-section of my improved plate and showing the disc about to be inserted, Fig. 3 is a plan view of the plate, Fig. 4 is a plan view of the disc, and Fig. 5 is a side elevation of a slightly modified form showing a disc of greater thickness than employed in the preferred form.

Referring now more particularly to the several views, I have shown conventionally a meat grinder 1 to which is secured the improved plate 2 in which there is secured, as will be more particularly referred to, the hardened disc 3.

In most of the meat grinders employed to-day, the plate 2 is formed of hardened steel about three-eighths of an inch in thickness, this plate being provided with series of rows of perforations thru which the meat is forced by the action of a revolving spiral, a knife however lying adjacent the plate so that the meat is cut just before it is forced thru the perforations in the plate.

The usual plates are ordinarily forged of high carbon steel and then hardened and ground so that the edges of the holes are sharp to cut the meat as it is forced thru the holes of the plate.

After the edges about the holes become dull, the end plate is removed and should be sharpened on a grinder.

The present invention however contemplates using a plate of cheap metal, such as cast iron, or low carbon steel, or even a die casting of white metal or other sutiable material and then this plate 2 is cut out or cast on its inner face as at 4 leaving the slightly projecting hub 5 and outer rim 6.

The plate is then provided with a series of perforations 7 and it will be understood that these perforations may be stamped therein or the plate may be a casting with these series of holes formed therein, as the edges about the upper surfaces of these holes do not have to be sharp as the further disc 3, to be shortly referred to, is to be secured in this casting.

At a point 8 in the periphery of the casing, the rim is scored or cut out throughout its depth and the metal on the outer edge of the rim adjacent the score is slightly removed as at 8, so that small projections or lugs of the disc to be mentioned may fit flush within the casing.

Of course other means for holding the two plates tightly together might be used such as dowel pins, knurling the edges to fit in corresponding knurlers in the casing, but I have found the means shown to be very satisfactory.

Referring now to Fig. 4, there will be seen a small metal disc of slightly less diameter than the plate 2 which disc may be of cold-rolled sheet steel and afterwards case-hardened, or may be hardened tool steel, or, may be thick high speed steel-drilled and hardened. There will also be seen the series of perforations 9 and these are preferably all stamped in the disc before the same is hardened. This disc need not be over a thirty-second of an inch in thickness as it is designed to be placed there within the plate 2 above refered to.

There is an opening 10 centrally of the disc to tightly fit over the projecting hub 5 and the disc is supposed to be pressed down within the plate and its surface lies flush with the surface of the rim of the plate.

The diameter of this disc and the diameter of the central opening is to be such that by sweating the disc may be placed within its casing and as far as the customer is concerned, the disc is permanently attached in the casing, or in other words, it will take a factory operation to remove the same.

The purpose of this is so that the customer will be forced to return the casing or plate with the disc therein to the manufacturer and the manufacturer may then remove the disc and grind it, if he so desires and replace it, or he may discard the disc and place in a new one and charge it to the customer.

In this manner the manufacturer of the plate is assured of the money for the replacement and is also assured that the cutter and disc may go out in perfect condition, which cannot be foretold with some unauthorized party furnishing new discs and grinding old ones.

It is essential that the perforations in the disc registers with the perforations in the casing or plate and to insure this, I score or cut out one edge of the disc 11 so that it will register with the cut-out portion 8 in the rim of the plate, and I then press the two little lugs or projections 12 to fit within the small cutout portions 8' formed about the score 8 in the plate so that when this score and projections are once registered within place in their casing, and the hole in the disc fit over the hub, the perforations in the disc will perfectly register with the perforations in the plate.

By using a plate as described, the perforations or holes have the necessary depth so that the meat will be shredded as it passes thru the plate, and the chopped meat will have the desired appearance and by having the hardened tool steel disc, the edges about the holes in the disc will be sharp and the knife passing over the disc will cleanly cut the meat so that the function of the ordinary plate is preserved and at the same time only a disc of say a thirty-second of an inch in diameter of hardened steel is used rather than a plate of anywhere from three-eighths or one-half an inch, thus materially saving the cost of the plate.

Again another advantage is that by using a casing and a disc which is sweated in the casing, the two parts are held solidly together, leaving no space between these two parts in which meat might wedge its way.

Furthermore, the disc may be removed by a factory operation and properly ground and replaced or a new metal disc may again be sweated into position without discarding the entire plate as is often the case with the old form.

Referring now to a slightly modified form, there is shown a similar form of plate 13 and a similar form of disc 14, the only difference in this instance being that the disc is thicker in cross-section so that it will project slightly above the upper edge of the rim of the casing when in position. This allows for several grinding operations of the same disc before making it necessary to discard the same.

In Fig. 1 I have shown a cutter or knife but this forms the subject matter of a separate application.

From the foregoing, it will be seen that I have devised a plate in the form of a holder in which may be placed relatively thin discs which is a far less expensive procedure than forming a whole relatively thick plate out of expensive drop forgings of hardened steel. Furthermore, the manufacturer will benefit by the sale of discs as they cannot be replaced except by a factory operation which the ordinary meat dealer or use of the machine cannot perform.

I am aware that it is old to use separate plates but they are generally easily inserted and are not permanent in the sense that it is necessary for a factory operation to replace them.

It will also be understood that my plate or shell furnishes the required strength; the steel disc the required cutting surface, while the thickness of the casing or shell and the length of its holes gives the desired appearance to the chopped meat.

Many slight changes might be made without departing from the spirit or scope of the invention.

Having thus described the same, what I claim as new and desire to secure by Letters Patent is:

1. An end plate for a meat chopper formed of relatively cheap metal and provided with a plurality of perforations, a hub in said plate and a portion of one surface of the plate being removed to leave a projecting portion of the hub and a peripheral rim, a hardened tool steel disc provided with a plurality of perforations, said disc provided with an opening adapted to be forced over said hub and the circular edge of said disc fitting tightly within the rim of the plate, and its outer surface extending beyond the rim of the plate the disc and plate being scored at one place on their periphery and the plate provided with small cut-out portions adjacent the score, the said disc provided with ears fitting within said cut-out portions, whereby after the disc is forced into place they are substantially integral one with the other.

2. An end plate for a meat grinder formed of relatively cheap metal and provided with a plurality of perforations, said plate on one surface being cut away to form a peripheral rim and a slightly protruding hub, a tool steel disc fitting within said rim and about said hub, means on the plate and disc for inter-locking the one with the other and the outer surface of the disc extending slightly above the rim of the plate.

In testimony whereof I affix my signature.

CHARLES A. LAEMMEL.